May 4, 1926.
E. W. LANE
1,583,696
AUXILIARY OIL RESERVOIR
Filed March 5, 1924
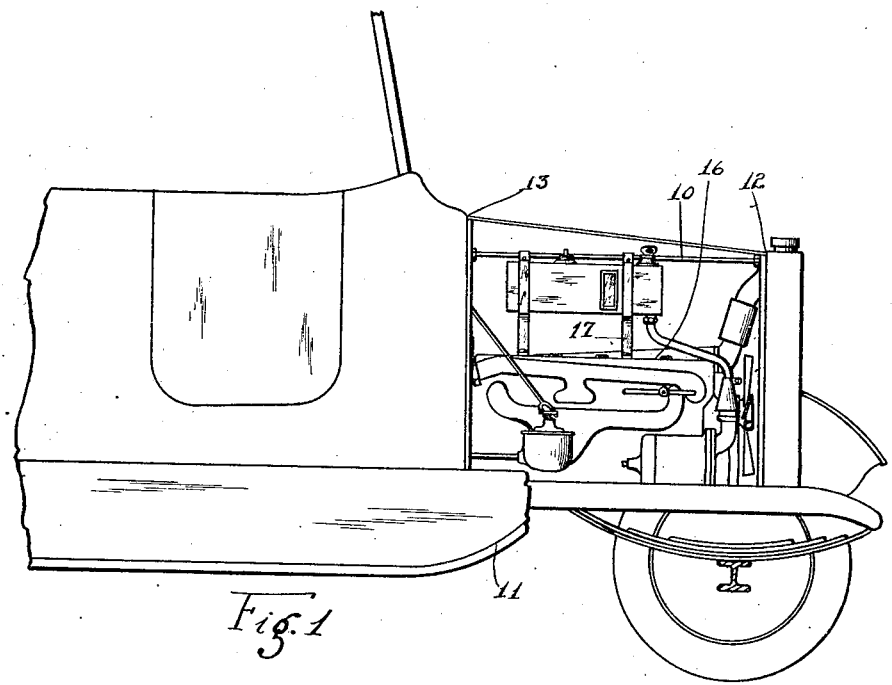
Fig. 1
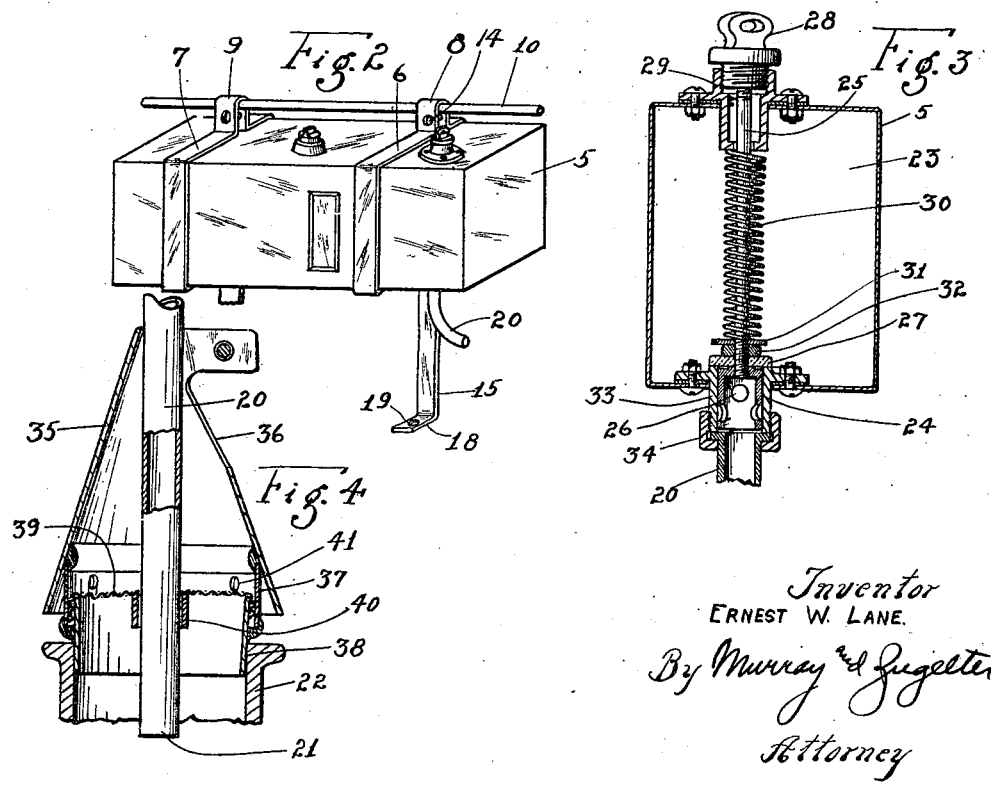
Inventor
ERNEST W. LANE.
By Murray and Gugelter
Attorney Patented May 4, 1926.

1,583,696

UNITED STATES PATENT OFFICE.

ERNEST W. LANE, OF NEW VIENNA, OHIO.

AUXILIARY OIL RESERVOIR.

Application filed March 5, 1924. Serial No. 697,035.

*To all whom it may concern:*

Be it known that I, ERNEST W. LANE, a citizen of the United States of America, and a resident of New Vienna, in the county of Clinton and State of Ohio, have invented a new and useful Improvement in an Auxiliary Oil Reservoir, of which the following is a specification.

An object of my invention is to provide an auxiliary reservoir for lubricating oil that may be carried under the hood of automobiles and be positioned for discharging into the oil tank or crank shaft chamber of an automobile engine, whereby the operator can replenish the oil supply in the oil chamber without soiling his apparel.

Another object of my invention is to provide a simple and efficient device for the purpose stated.

These and other objects are attained by the means described herein and disclosed in the accompanying drawing, in which:

Fig. 1 is a fragmental side elevation, parts being broken away, showing the motor vehicle having mounted on it an auxiliary reservoir embodying my invention.

Fig. 2 is an enlarged perspective view of a reservoir embodying my invention.

Fig. 3 is an enlarged transverse sectional view through the reservoir embodying my invention and showing the valve structure associated therewith.

Fig. 4 is an enlarged fragmental transverse sectional view through a breather nozzle of a motor vehicle having mounted upon it a discharge nozzle associated with the reservoir shown in Fig. 2 and forming a detail of my invention.

The reservoir 5 may be of any suitable size and shape and is supported by straps 6 and 7 that encircle the reservoir and are provided with upwardly extending loops 8 and 9 for the reception of a rod 10 mounted on the motor vehicle 11 and extending between the automobile radiator 12 and dash 13. Bolts 14 associated with the straps 6 and 7 may be used to clamp the straps upon the rod 10. The straps 6 and 7 are provided with downwardly extending legs 15 that engage the upper surface of the engine block 16 and may be bolted thereto by means of bolts 17 extending through the feet 18 formed on the bottom of the legs 15 and provided with suitable apertures 19. A pipe 20 leads from the lower casing of the reservoir 5 and has its lower end or discharge end 21 disposed within the breather nozzle 22 on the engine casing forming part of the engine block 16. A valve is associated with the tank and the upper or receiving end of the pipe 20 for controlling the flow of lubricant from the chamber 23 within the reservoir 5 through the pipe 20. By reference to Fig. 3 it will be apparent that the valve 24 carried by the valve stem 25 is lifted to effect registration of the ports 26 in the valve casing 24 with the chamber 23 whereupon the lubricant may flow through the pipe 20. The valve casing 24 is carried at the lower end of the stem 25 and is disposed below a washer 27 that serves as a supplemental valve for sealing the tank 23 adjacent the pipe 20. The upper end of the stem 25 is secured upon the screw plug 28 that may be screwed into the casing 29 carried by the upper wall of the reservoir 5. A spring 30 extends about the stem 25 and has its opposite ends in abutment upon the casing 29 and a washer 31 carried by the stem 25 adjacent the valve or washer 27. A nut 32 mounted upon the lower end of the stem 25 controls adjustment of the valves 27 and 24 longitudinally of the stem 25. The spring 30 yieldingly retains the valve casing 24 within the sleeve-like casing 33 carried by the lower wall of the reservoir 5 and which wall 33 is connected with the pipe 20 by a suitable collar or coupling 34. The lower end or discharge end of the pipe 20 carries a conical apron 35 that diverges downwardly that is provided adjacent its top with an aperture 36. Within the apron and adjacent the lower end thereof is provided a cylindrical flange 37 that receives and is received by the upper end of an upwardly flaring tube 38. The lower end of the tube 38 is adapted to enter the mouth of the breather 22 and to seat upon the inner wall thereof. A screen 39 is secured between the tube 38 and the flange 37. A sleeve 40 is carried centrally of and by the tube 38 and receives the pipe 20. The flange 37 is provided with apertures 41 through which air may find its way to and through the breather 22.

The operation of my device is obvious. However, it is desired to call attention to the fact that many autoists prefer using a given lubricant. It oftentimes happens that at the time when the operator requires additional lubricant he is not in the vicinity of a service station that can supply him with the lubricant that he has been using. It has been definitely demonstrated and proven that various lubricants, if admixed, have in many cases their lubricating qualities impaired and oftentimes destroyed. When an autoist carries a supply of his preferred lubricant with him he has heretofore been obliged to carry same under one of the seats of the vehicle or upon the running board at the side of the vehicle. Some vehicles do not permit carriage of a supply of lubricant at either of said places. In cold weather, such auxiliary supplies of lubricant become solid and it is impossible to transfer same to the oil chamber. When a machine is equipped with a device as disclosed herein the auxiliary supply of lubricant is kept in a fluid state by the heat below the hood of the vehicle wherefore the operator need only unscrew the plug 28 and lift the valve against the yielding resistance of the spring 30 to supply the desired lubricant to the oil chamber. Should an operator inadvertently turn from the valve after same had been opened the spring 30 will close the valve thereby precluding a flow of lubricant from the reservoir 5 while the operator is distracted. The space above the engine block and below the rod 10 in motor vehicles is generally waste space wherefore the utilization of this space in the manner disclosed herein effects a happy solution for a number of problems confronting the average motorist.

What I claim is:

1. In a device of the class described the combination with a motor vehicle having an internal combustion engine comprising an oil chamber and a breather nozzle communicating with the oil chamber, and having a dash and a rod extending from the dash, of a pair of straps each mounted upon the rod and having a leg mounted upon the engine, a reservoir supported by the straps, a pipe adapted to direct a fluid from the reservoir into the breather nozzle and a valve controlling the flow of fluid through the pipe.

2. In a device of the class described the combination with a motor vehicle having an internal combustion engine comprising an oil chamber and a breather nozzle communicating with the oil chamber, and having a dash and a rod extending from the dash, of a pair of straps each mounted upon the rod and having a leg mounted upon the engine, a reservoir supported by the straps, a pipe adapted to direct a fluid from the reservoir into the breather nozzle and a self seating valve controlling the flow of fluid through the pipe.

In testimony whereof, I have hereunto subscribed my name this 29th day of February, 1924.

ERNEST W. LANE.